April 18, 1950     C. L. EKSERGIAN     2,504,668
SHOE MOUNTING FOR BRAKE ASSEMBLIES
Filed Feb. 22, 1945
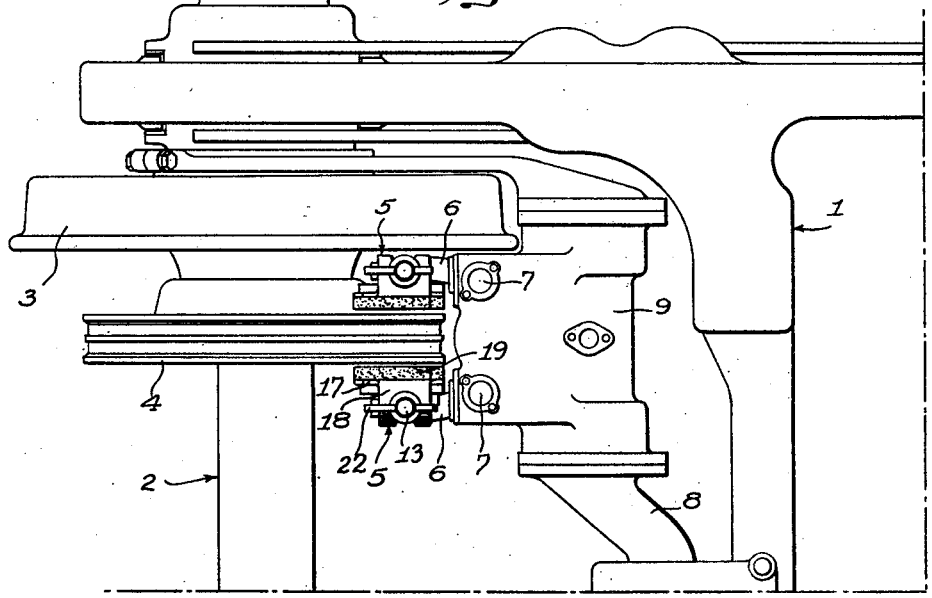
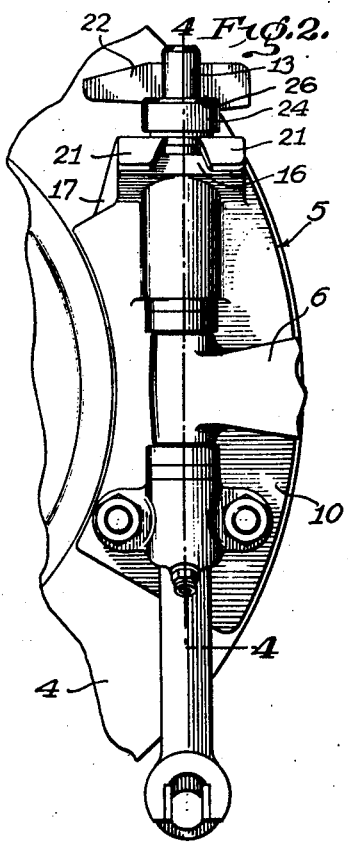
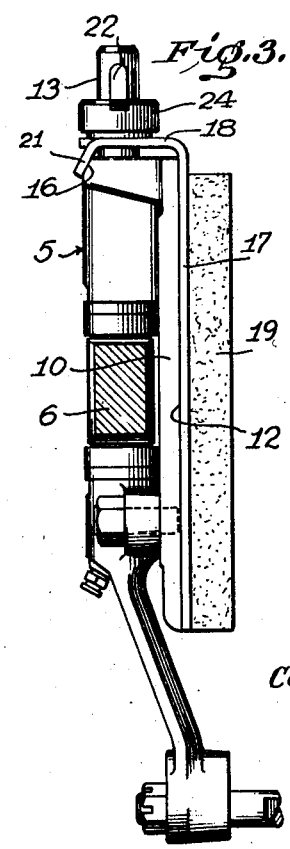
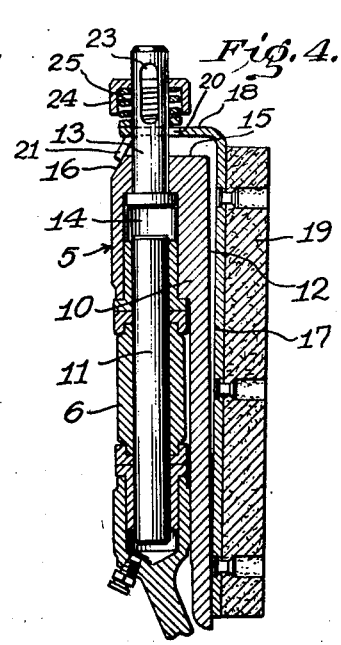
Carolus L. Eksergian
INVENTOR
BY John P. Barbo
ATTORNEY Patented Apr. 18, 1950

2,504,668

UNITED STATES PATENT OFFICE 2,504,668

SHOE MOUNTING FOR BRAKE ASSEMBLIES

Carolus L. Eksergian, Detroit, Mich., assignor to The Budd Company, Philadelphia, Pa., a corporation of Pennsylvania Application February 22, 1945, Serial No. 579,175

4 Claims. (Cl. 188—234)

The invention relates to brake mechanism and particularly to such a mechanism in which the wear surfaces or shoes proper are readily mounted or demounted and securely held in place when mounted.

The invention is more particularly concerned with the disc-type of brake in which the shoes engage the opposite sides of a rotary disc-like member to effect the braking.

It is an object of the invention to make the shoe assembly of such brakes of a simplified form, to facilitate the manufacture thereof and in which the shoes proper are readily positioned or removed from the brake head carrying them by simple relative endwise movement.

To this end the brake heads and the shoes proper are constructed as separate sub-assemblies and are provided with interengaging positioning means which securely hold them in their proper relation, and including quick detachable means for readily disconnecting them and thereby permitting the shoes to be moved endwise of the mounting heads for disassembly or replacement.

Other and further objects and advantages and the means through which they are attained will become apparent from the following detailed description when read in connection with the drawings forming a part thereof.

In the drawings:

Fig. 1 is a plan view of one-quarter of a railway truck showing a brake mechanism to which the invention has been applied;

Fig. 2 is a fragmentary side elevational view of the interengaging brake elements of the invention;

Fig. 3 is an edge view of the brake shoe assembly and connected parts, parts being shown in section; and, Fig. 4 is a fragmentary sectional view taken substantially along the line 4—4 of Fig. 2, showing the parts during assembly, but before the shoe proper is firmly secured in place.

The invention has been shown applied to the brake mechanism of a railway truck in which the frame 1 is supported in a usual manner from the wheel and axle assembly 2 carrying the wheels as 3, and rotary brake discs as 4, secured to rotate with each wheel.

In cooperative relation with the opposed faces of the disc 4 are arranged the brake shoe assemblies designated generally by 5, 5. These assemblies are pivotally carried by brake levers 6, 6 which in turn are pivotally carried at 7, 7 by a brake support, designated generally by 8 which is in turn carried by the wheel and axle assembly 2 and the truck frame 1 in a manner similar to that disclosed and claimed in copending application, Serial No. 399,779, for Brake mechanism, filed June 26, 1941, now Patent No. 2,413,614, issued December 31, 1946. The levers 6,6 are actuated by a cylinder actuator 9 similar to the cylinder actuator of the referred to copending application.

Since the invention is not concerned with the general arrangement of the brake mechanism, the above brief description is believed to suffice to indicate the manner in which the invention fits into such arrangement.

Each brake shoe assembly, according to the invention, comprises a brake head, as 10, of arcuate segmental form which has pivotally secured to the outer face thereof as by pivot pin 11, the associated brake lever 6. The opposite or inner face of the brake head 10 is machined flat to provide a plane surface, and in this preferred form, has no projections beyond said flat face, designated by 12. At its upper end the brake head is formed with a projecting locating and securing pin, as 13, which pin, as shown, may be a headed pin driven through a hole aligned with the upper bearing recess 14 for the lever pivot pin 11. The upper end of the shoe beyond which the pin 13 extends is formed with a flat face 15 widened in the plane of the head and arranged at right angles to the face 12 and, on the side opposite the flat face 12 said face 15 is formed with additional locating means in the form of an inclined face 16.

The brake shoe proper to be assembled with said head may comprise a sheet metal backing plate having two angularly related portions 17 and 18. The portion 17 carries on the inner face thereof a suitable friction material, such as, composition brake lining 19 which is secured, as by countersunk rivets, to the backing plate portion 17. The angularly related portion 18 is provided with a transversely extending slot 20 which receives the locating and securing pin 13 and at its free edge it is formed on opposite sides of the pin with inclined portions 21, 21, see Fig. 2, which are adapted to cooperate with the inclined face 16 on the head 10.

Preferably, the angle between the portions 17 and 18 before final assembly is somewhat less than a right angle, as shown in Fig. 4. In the assembly, the shoe is first inserted over the locating pin 13, as shown in Fig. 4, with the lower edge of the backing plate portion 17 resting against the flat face 12 of the head and the margins of the inclined portions 21, 21 engaging the upper portion of the inclined face 16, as shown in Fig. 4. The shoe is then forced downwardly by quick detachable means for securing it in place.

Such means may comprise a key 22 having its entering end tapered on its upper face and fitting a slot 23 in the pin 13. A cup-shaped washer 24 is preferably located between the key and the portion 18 of the shoe, and a coil spring 25 has its ends engage the bottom of the cup and the portion 18, respectively. The key is provided with a cut out portion 26 in its lower face into which the spring snaps the top of the cup washer 24 when the key is in place, as shown in Figs. 2 and 3, to hold the key in locking position.

As the key is driven home, it forces the washer and spring downwardly, compressing the spring, and through the pressure so produced, forcing the inclined portions 21, 21 of the backing plate of the shoe downwardly over the inclined face 16. This has the effect of drawing the upper portion of the backing plate laterally so that the outer face of the portion 17 thereof is drawn into contact with the flat face 12 of the head, and the angle between the parts 17 and 18 is opened slightly in this operation, the resiliency of the parts exerting a spring action to hold the portion 17 and face 12 in firm contact.

The engagement of the pin 13 with the sides of the slot and the interengagement of the inclined portions 21, 21 on the opposite sides of the pin 13, with the inclined face 16, see Fig. 2, provide a strong positioning action in addition to the frictional engagement between portion 17 and flat face 12, to hold the lower end of the shoe from swinging in its own plane, thereby securely locking the shoe and head in operative relation.

It will be understood that when braking force is applied forcing the shoes against the disc, the friction between the large contacting flat metal faces 12 and 17 is additional insurance against relative shifting of the shoes and heads. With the arrangements shown, the shoes can readily be disassembled by knocking out the key 22, removing the cup washer 24 and spring 25, and then lifting the shoe upwardly off the locating and securing pin 13. The parts can be as readily assembled by proceeding in reverse order.

In the form of the invention shown, means may be associated with the lower ends of the brake heads 10 for holding the shoes on opposite sides of the disc in parallel relation. Such means is entirely similar to the means shown in copending application, Serial No. 529,730 for Brake mechanism, filed April 6, 1944, now Patent No. 2,402,386, issued June 18, 1946, and need not be described herein.

While the invention has been herein described in detail in a preferred form, it will be understood that changes and modifications may be made by those skilled in this art without departing from the main features of the invention, and such changes and modifications are intended to be covered by the appended claims.

What is claimed is:

1. A brake assembly comprising a head having a flat face on one side thereof and an end face having an inclined locating shoulder formed on the side thereof opposite said flat face, a locating and securing pin projecting from said end face, a removable brake shoe comprising a portion adapted to seat against said flat face and a portion normally extending therefrom at an angle slightly less than 90° and across the end face of the head, said last-named portion having a transverse slot receiving said pin and terminating in an inclined portion engaging said inclined locating shoulder, and quick detachable means associated with said pin for forcing said shoe endwise thereby securely locating it on the head through the interengaging inclined portions on the head and shoe respectively and bringing the first-named portion thereof into full seating engagement with the flat face of the head.

2. A brake assembly comprising a head having a flat face on one side thereof and an end face having a locating shoulder on the side thereof opposite said flat face, a locating and securing pin projecting from said end face intermediate said flat face and said locating shoulder, a removable brake shoe comprising a metal backing plate having a portion seated against said flat face and a portion extending across the end face and having locating engagement with said pin and said shoulder, and quick detachable means cooperating with said pin for securing said shoe on the head.

3. A brake assembly comprising a head having a flat face on one side thereof and an end face formed on the side opposite said flat face with an inclined locating shoulder widened in the plane of said head, a locating and securing pin projecting from said end face intermediate said flat face and said inclined shoulder, a removable brake shoe comprising a portion adapted to seat against said flat face and a portion normally extending therefrom at an angle slightly less than 90° and across the end face of the head, said last-named portion having a transverse slot receiving said pin and terminating in an inclined portion having widely-spaced engagement with said widened inclined locating shoulder, and quick detachable means associated with said pin for forcing said shoe endwise thereby securely locating it through the interengaging inclined portions on the shoe and head, respectively, and bringing the first-named portion thereof into full seating engagement with the flat face of the head.

4. A brake assembly comprising a head having a planar face on one side thereof and having locating means, including an end locating face at an angle to said planar face and a pin projecting from said end locating face lengthwise of the head, all said locating means being adjacent one end of the head and forming the sole means for locating a shoe on the head, a removable brake shoe comprising a metal backing plate having a portion seated against said planar face and a portion engaging said locating means to position the shoe on the head, and quick-detachable means for securing said shoe on the head but permitting its straight endwise removal therefrom upon the release of said quick-detachable means.

CAROLUS L. EKSERGIAN.

REFERENCES CITED

The following references are of record in the file of this patent:

UNITED STATES PATENTS

| Number | Name | Date |
|---|---|---|
| 658,856 | Mitchell | Oct. 2, 1900 |
| 931,093 | Simpson | Aug. 17, 1909 |
| 1,561,703 | Down | Nov. 17, 1925 |
| 1,912,684 | Blume | June 6, 1933 |
| 2,027,823 | Hoffman | Jan. 14, 1936 |